United States Patent Office 3,661,986
Patented May 9, 1972

---

3,661,986
PREPARATION OF ALPHA-CHLOROALIPHATIC ACIDS
Paul H. Washecheck, Ponca City, Okla., assignor to Continental Oil Company, Ponca City, Okla.
No Drawing. Filed Feb. 5, 1969, Ser. No. 796,908
Int. Cl. C07c *51/26*
U.S. Cl. 260—530 R     3 Claims

---

ABSTRACT OF THE DISCLOSURE

Alpha-haloaliphatic acids can be prepared directly by halo-oxidation of enolizable aldehydes in a one-step process by contacting the aldehyde with a halide in an aqueous medium and the absence of light. Alternatively the alpha-haloaliphatic acid can be prepared from alpha-haloaldehyde by the same process.

---

Alpha-haloaliphatic acids, particularly the alpha-chloroaliphatic acids, are useful intermediates for the preparation of numerous useful end products. These haloacids are readily esterified, and the esters can be subjected to dehydrohalogenation to form monomers which polymerize and find use as lube oil viscosity improvers. The most widely used haloacid is the alpha-chloroisobutyric acid; and, for that reason, the invention will be described with reference to the preparation of the alpha-chloroisobutyric acid.

The treatment of isobutyraldyde with chlorine does not form alpha-chloroisobutyraldehyde as would be expected. (See J. Brochet, Bull. Soc. Chemi, France 7, 641 (1892).) It is known, however, to prepare α-chlorobutyraldehyde with HCl and oxygen in the presence of copper catalyst. (See French Pat. No. 1,369,565, German Pat. No. 1,165,-569, Compt. rend. 231, 234–6 (1950).)

If isobutyric acid is chlorinated in the presence of a catalyst, say sulfur or phosphorus compound, then one gets a mixture of α- and β-chloroisobutyric acids (see U.S. Pats. Nos. 2,043,670; 2,111,509; and 2,111,510). These acids can be dehydrohalogenated to produce methacrylic acids and their derivatives; however, the presence of both the alpha and beta forms presents some difficulties, since the conditions for the dehydrohalogenation for the two isomers are quite different.

I have now found that the alpha-haloaliphatic aldehydes can be converted to alpha-haloaliphatic acids by relatively simple methods. Thus, according to this invention, the aldehyde is converted to the alpha-haloaldehyde and oxidized to the alpha-haloaliphatic acid, either by a single step or two-step process, wherein light is excluded. Light apparently promotes free radical halogenation, and I have found that much higher selectivity to the alpha-material is obtained if light is excluded. As indicated above, the invention will be illustrated by the preparation of alpha-chloroisobutyric acid.

The aldehydes to which this invention is applicable are enolizable aliphatic saturated aldehydes, e.g., having at least one hydrogen in the alpha position, and therefore must contain at least two carbon atoms. Preferably the maximum number of carbon atoms will be about twenty carbon atoms; however, the only upper limit is the availability of the aldehyde. The normal aldehydes are useful for production of useful alcohols; e.g., n-butyraldehyde is used in the production of 2-ethyl hexanol; however, the isobutyraldehyde, when reduced to isobutyl alcohol, is useful only as a solvent or other low value use. On the other hand, if such isobutyraldehyde were converted to methacrylate derivatives, the value would be greatly increased. Examples of suitable aldehydes include:

| | |
|---|---|
| Acetaldehyde | Propionaldehyde |
| Butyraldehyde | Pentanal |
| 2-methylbutanal | 3-methylbutanal |
| Hexanal | 2-methylpentanal |
| 3-methylpentanal | 4-methylpentanal |
| 2,3-dimethylbutanal | 3,3-dimethylbutanal |
| 2-ethylbutanal | Heptanal |
| 2-methylhexanal | Octanal |
| 2-methylheptanal | 2-ethylhexanal |
| Nonanal | 2-methyloctanal |
| Decanal | 3-propylheptanal |
| Dodecanal | 2-methylundecanal |
| 2-butyloctanal | Tetradecanal |
| 2-methyltridecanal | 2-pentylnonanal |
| Hexadecanal | 2-methylpentadecanal |
| 2-hexyldecanal | Octadecanal |
| 2-methylheptadecanal | 16-methylheptadecanal |
| 2-ethylhexadecanal | 2-heptylundecanal |
| 3-methylheptadecanal | |

The isobutyraldehyde is of particular commercial significance.

Suitable halogens include chlorine, bromine, fluorine, and iodine; however, chlorine is preferred for economic reasons, but technically any of the halogens are equally operable.

The temperature and pressure can vary over a wide range; however, atmospheric or only slight pressure will ordinarily be employed. Heat favors the yield of chloroacids up to about 65° C.; thus, I prefer a temperature in the range of 35° to 75° C., more preferably 45° to 65° C. The chloro-oxidation of the saturated aldehyde can be carried out as a one-step or a two-step process. Acidity is advantageous in the chlorination portion of the reaction. In general, increased acidity results in an increase in the selectivity of chlorination in the alpha position; however, acid appears to adversely effect the oxidation portion of the reaction.

Thus, the reaction can be carried out as a one-step process in which the acidity is chosen to balance the advantage of acidity in the chlorination reaction and the disadvantage of the acidity in the oxidation reaction. The reaction can also be carried out as a two-step process in which the acid used to an advantage in the chlorination portion of the reaction is diluted to minimize the disadvantage of acidity in the oxidation portion.

The process can also be operated in a third manner which is similar to the two-step process. The α-haloaldehyde can be prepared separately by some other method of the prior art. In this case, the chlorination portion of the reaction has already been accomplished and no acid is then required. Thus, the oxidation can be simply accomplished in an aqueous medium with no acid present. With no acid present the oxidation occurs in very high selectivity. In all three of the above cases, the exclusion of light is an essential part of the process.

The invention will be further described by the following examples, wherein a saturated aliphatic aldehyde is converted to the corresponding halo-acid utilizing isobutyraldehyde and chlorine.

EXAMPLE I.—THE ONE-STEP PROCESS

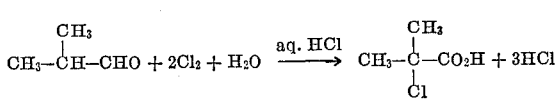

illustrates the reaction which probably proceeds as follows:

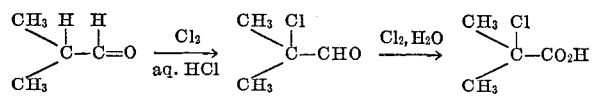

A solution of hydrochloric acid of the desired concentration was placed in a flask equipped with a stirrer, thermometer, condenser, and a chlorine inlet through a fritted glass disc in the bottom of the flask. The flask for the first series of runs was clear pyrex, and the flask for the second series of runs was painted black to exclude light. The temperature was set at the desired level by means of a water bath; and the chlorine flow, 250 ml./min., was started. Isobutyraldehyde (14.2 g., 0.2 mole) was injected into the acid solution (0.382 ml./min.). The first series of runs (in the presence of light) was stopped when the theoretical quantity of chlorine (0.4 mole) had been absorbed. The reaction in the second series (in the absence of light) was stopped when chlorine was no longer absorbed.

The organic products were then extracted with dichloromethane and dried over sodium sulfate. After filtration and removal of the solvent, the products were analyzed by gas chromatography using hexanoic acid as an internal standard. Results are shown in Tables I and II.

TABLE I.—CHLOROXIDATION OF ISOBUTYRALDEHYDE (LIGHT PRESENT)
(First Series)

| Run number | Conditions | | Analysis | | | | | | |
|---|---|---|---|---|---|---|---|---|---|
| | Temp. (° C.) | HCl | Acetic acid | Isobutyric acid | Methacrylic [1] acid | $\alpha$-Chloroisobutyric acid | $\beta$-Chloroisobutyric acid | Total | Total chloro acid |
| 1 | 25 | 0.1 N | 0.0 | 36.1 | 1.9 | 13.4 | 19.2 | 70.6 | 34.5 |
| 2 | 25 | 1.2 N | 1.0 | 16.3 | 1.7 | 41.2 | 28.3 | 88.5 | 71.2 |
| 3 | 25 | 3.0 N | 0.9 | 6.2 | 8.2 | 53.2 | 15.2 | 84.0 | 76.9 |
| 4 | 25 | 6.0 N | 1.0 | 1.1 | 5.1 | 49.3 | 4.2 | 60.7 | 58.6 |
| 5 | 25 | 7.8 N | 1.0 | 0.0 | 2.2 | 28.2 | 0.3 | 32.3 | 31.3 |
| 6 | 25 | 10.2 N | 1.4 | 0.7 | 2.6 | 26.4 | 0.1 | 31.2 | 29.1 |
| 7 | 40 | 0.1 N | 1.2 | 17.8 | 2.6 | 48.4 | 23.1 | 92.9 | 73.9 |
| 8 | 40 | 1.2 N | 1.7 | 8.3 | 5.1 | 63.2 | 11.2 | 89.5 | 79.5 |
| 9 | 40 | 3.0 N | 1.6 | 3.9 | 7.8 | 62.3 | 5.0 | 80.6 | 75.1 |
| 10 | 40 | 6.0 N | 1.0 | 0.4 | 3.2 | 36.5 | 1.9 | 43.0 | 41.6 |
| 11 | 0 | 6.0 N | 0.8 | 9.0 | 4.7 | 37.6 | 21.2 | 73.3 | 63.5 |
| 12 | 15 | 6.0 N | 2.3 | 1.4 | 3.6 | 38.8 | 6.7 | 52.8 | 49.1 |
| 13 | 25 | 6.0 N | 1.0 | 1.1 | 5.1 | 49.3 | 4.2 | 60.7 | 58.6 |
| 14 | 40 | 6.0 N | 1.0 | 0.4 | 3.2 | 36.5 | 1.9 | 43.0 | 41.6 |
| 15 | 0 | 3.0 N | 0.6 | 15.3 | 5.0 | 24.9 | 37.8 | 83.6 | 67.7 |
| 16 | 25 | 3.0 N | 0.9 | 6.2 | 8.2 | 53.5 | 15.2 | 84.0 | 76.9 |
| 17 | 40 | 3.0 N | 1.6 | 3.9 | 7.8 | 62.3 | 5.0 | 80.6 | 75.1 |
| 18 | 25 | 1.2 N | 1.0 | 16.3 | 1.7 | 41.2 | 28.3 | 88.5 | 71.2 |
| 19 | 40 | 1.2 N | 1.7 | 8.3 | 5.1 | 63.2 | 11.2 | 89.5 | 79.5 |
| 20 | 50 | 1.2 N | 1.7 | 10.2 | 2.1 | 59.3 | 13.5 | 86.8 | 74.6 |
| 21 | 25 | 0.1 N | 0.0 | 36.1 | 1.9 | 13.4 | 19.2 | 70.6 | 34.5 |
| 22 | 40 | 0.1 N | 1.2 | 17.8 | 2.6 | 48.2 | 23.1 | 92.9 | 73.9 |

[1] Methacrylic acid is an artifact of the analysis formed by pyrolysis of the chloroacids in the injector block of the gas chromatograph.

NOTE.—Data is mole percent.

TABLE II.—CHLOROXIDATION OF ISOBUTYRALDEHYDE (LIGHT ABSENT)
(Second Series)

| Run number | Conditions | | Analysis | | | | | | |
|---|---|---|---|---|---|---|---|---|---|
| | Temp. (° C.) | HCl | Acetic acid | Isobutyric acid | Methacrylic [1] acid | $\alpha$-Chloroisobutyric acid | $\beta$-Chloroisobutyric acid | Total | Total chloro acid |
| 23 | 35 | 3.0 N | 0.5 | 24.2 | 1.3 | 34.9 | 2.2 | 63.1 | 38.4 |
| 24 | 35 | 6.0 N | 0.8 | 0.9 | 1.3 | 42.1 | 0.0 | 45.1 | 43.4 |
| 25 | 35 | 7.8 N | 1.0 | 0.9 | 2.3 | 57.6 | 0.1 | 61.9 | 60.0 |
| 26 | 35 | 10.2 N | 0.7 | 0.5 | 1.5 | 34.4 | 0.0 | 37.1 | 35.9 |
| 27 | 35 | 12.0 N | 0.5 | 0.4 | 1.0 | 25.1 | 0.0 | 27.0 | 26.1 |
| 28 | 45 | 3.0 N | 1.0 | 12.1 | 1.7 | 47.9 | 1.2 | 63.9 | 50.8 |
| 29 | 45 | 6.0 N | 1.1 | 1.2 | 2.8 | 73.1 | 0.2 | 78.4 | 76.1 |
| 30 | 45 | 7.8 N | 0.6 | 0.8 | 2.1 | 48.4 | 0.0 | 51.9 | 50.5 |
| 31 | 55 | 3.0 N | 0.8 | 5.2 | 2.3 | 69.2 | 0.9 | 78.4 | 72.4 |
| 32 | 55 | 6.0 N | 0.9 | 1.5 | 2.1 | 69.8 | 0.2 | 74.5 | 72.1 |
| 33 | 55 | 7.8 N | 1.1 | 1.0 | 2.1 | 49.6 | 0.0 | 53.9 | 51.7 |
| 34 | 65 | 1.2 N | 0.5 | 8.1 | 2.9 | 72.0 | 1.8 | 85.3 | 76.7 |
| 35 | 65 | 3.0 N | 0.4 | 3.8 | 3.9 | 74.7 | 0.5 | 83.3 | 79.1 |
| 36 | 65 | 4.2 N | 0.9 | 1.3 | 3.2 | 74.3 | 0.3 | 80.0 | 77.8 |
| 37 | 65 | 6.0 N | 0.9 | 1.1 | 2.1 | 69.5 | 0.0 | 73.6 | 71.6 |
| 38 | 65 | 7.8 N | 0.9 | 1.3 | 1.7 | 51.2 | 0.0 | 55.1 | 52.9 |
| 39 | 75 | 1.2 N | 0.6 | 10.1 | 1.8 | 53.7 | 0.8 | 67.0 | 56.3 |
| 40 | 75 | 3.0 N | 1.0 | 6.9 | 2.2 | 61.6 | 0.7 | 72.4 | 64.5 |
| 41 | 75 | 6.0 N | 0.9 | 1.7 | 2.1 | 56.8 | 0.0 | 61.5 | 58.9 |
| 42 | 25 | 7.8 N | 0.7 | 0.7 | 1.7 | 32.8 | 0.0 | 35.9 | 34.5 |
| 43 | 35 | 7.8 N | 1.0 | 0.9 | 2.3 | 57.6 | 0.1 | 61.9 | 60.0 |
| 44 | 45 | 7.8 N | 0.6 | 0.8 | 2.1 | 48.4 | 0.0 | 51.9 | 50.5 |
| 45 | 55 | 7.8 | 1.1 | 1.0 | 2.1 | 49.6 | 0.0 | 53.8 | 51.1 |
| 46 | 65 | 7.8 | 0.9 | 1.3 | 1.7 | 51.2 | 0.0 | 55.1 | 52.9 |
| 47 | 35 | 6.0 N | 0.8 | 0.9 | 1.3 | 42.1 | 0.0 | 45.1 | 43.4 |
| 48 | 45 | 6.0 N | 1.1 | 1.2 | 2.8 | 73.1 | 0.2 | 78.4 | 76.1 |
| 49 | 55 | 6.0 N | 0.9 | 1.5 | 2.1 | 69.8 | 0.2 | 74.5 | 72.1 |
| 50 | 65 | 6.0 N | 0.9 | 1.1 | 2.1 | 69.5 | 0.0 | 73.6 | 71.6 |
| 51 | 75 | 6.0 N | 0.9 | 1.7 | 2.1 | 56.8 | 0.0 | 61.5 | 58.9 |
| 52 | 35 | 3.0 N | 0.5 | 24.2 | 1.3 | 34.9 | 2.2 | 63.1 | 38.4 |
| 53 | 45 | 3.0 N | 1.0 | 12.1 | 1.7 | 47.8 | 1.2 | 63.9 | 50.8 |
| 54 | 55 | 3.0 N | 0.8 | 5.2 | 2.3 | 69.2 | 0.9 | 78.4 | 72.4 |
| 55 | 65 | 3.0 N | 0.4 | 3.8 | 3.9 | 74.7 | 0.5 | 83.3 | 79.1 |
| 56 | 75 | 3.0 N | 1.0 | 6.9 | 2.2 | 61.6 | 0.7 | 72.4 | 64.5 |

[1] Methacrylic acid is an artifact of the analysis formed by pyrolysis of the chloroacids in the injector block of the gas chromatograph.

NOTE.—Data in mole percent.

EXAMPLE II

Alpha-chloroisobutyraldehyde (42.0 g.) and 300 ml. of water were charged to a black flask equipped with a magnetic stirrer, thermometer, condenser, and chlorine inlet through a fritted disc in the bottom of the flask. The temperature was raised to 65° C. by means of a water bath; and, thereafter, chlorine flow (200 ml./min.) was started. The chlorine flow was continued for five hours.

The organic product was extracted with dichloromethane and dried over sodium sulfate. After filtration and removal of the solvent, a colorless oil, 43.55 grams, remained. The oil was identified as alpha-chlorobutyric acid contaminated with a small amount of unreacted alpha-chloroisobutyraldehyde.

The exact conversion could not be readily determined; however, the selectivity to the alpha-chloroisobutyric acid was in excess of 95 percent.

The above two examples clearly show the advantage of chloro-oxidizing the aldehyde or chloro-aldehyde in the absence of light.

Three additional runs were made to directly compare the one-step and the two-step processes. The data are tabulated in Table III.

TABLE III.—CHLOROXIDATION OF ISOBUTYRALDEHYDE
One-step vs. Two-step

| Run number | Temp. (° C.) | HCl | Acetic acid | Isobutyric acid | Methacrylic acid | α-Chloro-isobutyric acid | β-Chloro-isoburyric acid | Total chloro acids | |
|---|---|---|---|---|---|---|---|---|---|
| 57 [1] | 65 | 3.0 N | 0.4 | 3.8 | 3.9 | 74.7 | 0.5 | 83.3 | 79.1 |
| 58 [2] | 65 | 3.0 N | 0.7 | 2.4 | 2.2 | 81.0 | 0.6 | 86.9 | 83.8 |
| 59 [3] | 65 | 3.0 N | 0.7 | 4.0 | 2.2 | 80.4 | 0.8 | 88.1 | 83.4 |

[1] Standard one-step process.
[2] Two-step process. 300 ml. water added after injection of all isobutyraldehyde.
[3] Two-step process. Isobutyraldehyde not injected. 300 ml. water added after 1 molar equivalent of chlorine had been absorbed.

Having thus described the invention, I claim:

1. A process for halo-oxidation of enolizable aliphatic saturated aldehydes to the corresponding α-halo-acids which comprises contacting the aldehyde in aqueous medium with a halogen while excluding light at a temperature in the range of 35° to 75° C. until the aldehyde is converted substantially to alpha-halo-acids, said aqueous medium containing an acid of the halogen in at least a 1 normal solution.

2. The process of claim 1 wherein the halogen is chlorine and the acid is hydrogen chloride.

3. The process of claim 2 wherein the aldehyde is isobutyraldehyde and the product is primarily alpha-chloroisobutyric acid.

References Cited

FOREIGN PATENTS 682,354  11/1952  Great Britain _____ 260—530

OTHER REFERENCES

Noller: Chemistry of Organic Compounds, 3rd ed., Saunders Co. (1965), pp. 241–242.

LORRAINE A. WEINBERGER, Primary Examiner

R. D. KELLY, Assistant Examiner

U.S. Cl. X.R.

260—408